Nov. 1, 1938. L. P. HELTNE 2,135,104
METHOD FOR THE TREATMENT OF DRIED CASSAVA ROOTS TO OBTAIN STARCH
Filed Dec. 28, 1936

Patented Nov. 1, 1938

2,135,104

UNITED STATES PATENT OFFICE 2,135,104

METHOD FOR THE TREATMENT OF DRIED CASSAVA ROOTS TO OBTAIN STARCH

Laurits Pedersen Heltne, Volda, Romsdal, Norway

Application December 28, 1936, Serial No. 117,956
In the Netherlands December 30, 1935

1 Claim. (Cl. 127—66)

The present invention relates to the manufacture of starch from cassava roots and has for its object a method as well as means for the treatment of dried cassava roots to obtain a large output of high grade starch therefrom.

An important characteristic feature of the present process consists therein that the dry cassava roots in a coarsely cut condition prior to being soaked in water are converted into a long-fibrous mass, avoiding as far as possible the formation of flour or powder. The desired character of disintegration (separation into fibers) is brought about in the manner that the dry roots after having been cut into pieces are subjected to pressure between rotating rollers and thus crushed without being at the same time ground or triturated. In order to avoid trituration during the pressure treatment, it is of importance that the rollers, between which the pressure treatment takes place, are rotating with substantially equal peripheral velocities. Consequently the rollers should not rotate with substantially different velocities as is the case in the conventional grain mills.

In order to bring about satisfactory separation into fibers (without trituration) by the pressure action, it is necessary, however, to effect the pressure treatment in steps between pairs of rollers with interspaces of decreasing widths. Because the material leaving the rollers is in the form of highly compressed flat flakes or sheets, it is preferred to loosen up the same by means of some suitable combing arrangement before it is subjected to further treatment between a succeeding couple of rollers or preparatory to the final soaking in water.

By this particular method of preparatory treatment of the dry cassava roots the result is attained that hard constituents of the material, such as pieces of bark or of the stalk (the part of the stalk adjacent to the root) are not converted into the form of a flour (as in the case of an ordinary grain mill), but enter the soaking tubs as long fibre bundles and therefore do not enter into the recovered starch as an impurity.

Before the roots are subjected to the disintegration treatment in accordance with the present invention, they are suitably subjected to a cleansing treatment, to remove dust adhering to the surface of the roots as well as a part of the bark (cortex). This may be brought about in various ways and by means of contrivances of the most varied types. One may, for example, for this purpose make use of a rotating drum, through which the roots are continuously passed and wherein dust and offal may be removed by air blast from some conventional type of blower.

Thereupon the roots may be passed into a preparatory coarse cutting machine which may be the type of the conventional limestone breakers and thereafter over a magnet to remove pieces of iron.

After this preparatory treatment, the roots may be introduced into a machine with a plurality of roller pairs, where they are subjected to the disintegration treatment according to the present invention. The fibrous dry mass leaving the machine may continuously be introduced into vessels with water wherein the material is retained for some time, for example for one half or three quarters of an hour, according to the temperature of the water and the season of the year, while being stirred and thus converted into a suitable condition for further treatment, in sieves, suspension channels, sedimental tanks, centrifugal separators, driers etc. as usual in starch factories.

It has been found by experiments made on a manufacturing scale that it is possible in the described manner to obtain a considerably increased output of high quality starch (about 70–80%) as compared with the conventional methods of recovering starch from dry cassava roots. In the conventional method, the output of starch is usually only about 55–60% and of this output only a comparatively small part is of first class quality, while the remainder is an inferior product.

By chemical examinations it has been ascertained that the starch produced according to the present invention is very pure and of excellent quality.

Owing to the fact that the time required for soaking the material prepared according to the invention is quite short and only about a twentieth of that necessary when the roots are soaked in the ordinary coarsely cut condition, a great saving in capital investment and labour expenses is attained by the use of the present method.

The brief soaking time also has the effect that the colouring matter contained in the cortex is kept separated from the starch, so that the final product will be of a lighter colour than the products obtained by processes in which the roots are disintegrated after soaking.

An apparatus for disintegration of the roots according to the invention is illustrated in the accompanying drawing.

Figure 1:
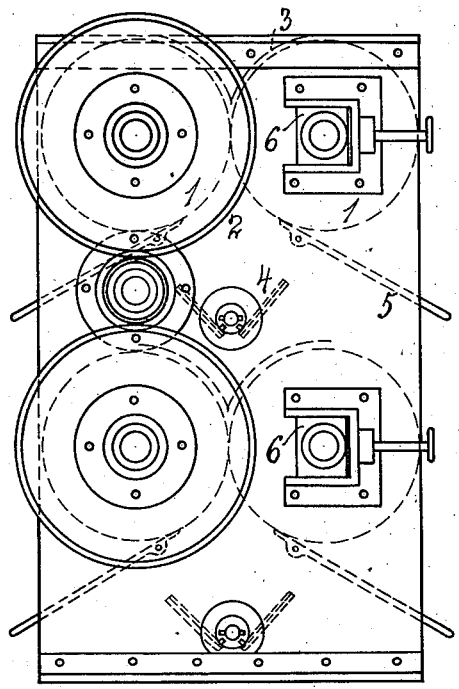
Fig. 1 is a front view of two roller pairs, constituting a part of a machine which is composed of six such parts.
Figure 2:
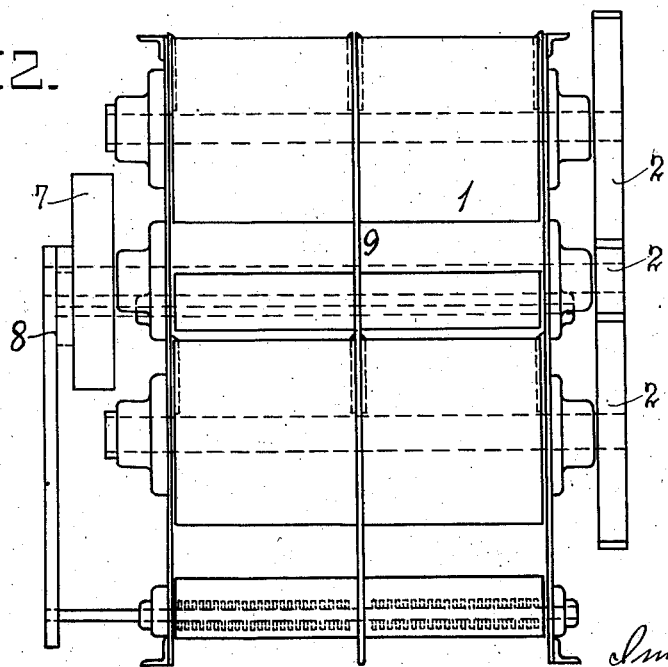
Fig. 2 is a side view of the same part of the machine.

The whole machine consists of twelve pairs of adjustable rollers. The individual rollers in each pair have the same diameter and rotate with the same peripheral velocity.

Below each pair of rollers 1 is situated a feeding arrangement for the next pair of rollers. This feeding arrangement comprises two sloping side walls disposed under an angle of about 90° in relation to one another, and in such a way as to leave an opening at the bottom. Near the bottom opening is placed a rotating roller, having projecting needles, cooperating with a stationary row of needles or pins on the sloping wall, so as to act like a combing device. This device acts to loosen up flakes of material entering from the rollers above as well as to promote a uniform distribution of the material fed to the next set of rollers in the series.

Because in the illustrated example the raw-material has to pass through twelve sets of rollers in order to attain the character of disintegration aimed at, the machine is divided into two parts by means of a partition wall 9. The material passes downwards, first between six sets of rollers, whereupon it is conducted above the rollers of the other division, from where it again passes downwards through six sets of rollers.

In the illustrated example, 1 are rollers, 2 cog-wheels, 3 walls by means of which the material is kept in the space between the rollers, 4 is a feeding and combing device and 5 knives to remove material from the rollers. 6 are adjustable bearings, 7 and 8 are pulleys and 9 is a partition wall dividing the machine into two separate sections.

In the illustrated example, one half of each of the rollers is somewhat reduced in diameter by turning off the surface. As a consequence of this, the interspace between the individual rollers in each half of the set will be of different width.

In operation the rollers in each set are so adjusted that the roots will wander through a series of interspaces of decreasing widths. The same result may of course also be attained by means of twelve separate sets of roller pairs, in which each pair is passed only once by the treated material. The machine illustrated in the drawing may be used as follows:

The dry cassava roots in pieces of about 10–25 cm. lengths are freed from dust, coarsely crushed and thereupon passed above a magnet and introduced into the hopper shaped space between the walls 3 at the left end of the top set of rollers. The material passes continuously downwards between six pairs of rollers with interposed combing arrangement. On leaving the lowermost set of rollers, it is caught by a conveyor (not seen in the drawing) and lifted to above the right section of the uppermost roller set. The material thereupon wanders downwards again between six sets of rollers and finally into the soaking vessels.

I claim:

Process for the manufacture of starch from dried cassava roots, which comprises the steps of converting the dried roots into a comparatively long-fibrous dry mass without substantial proportions of finely ground cell tissue, by subjecting the roots in a coarsely subdivided and dry condition to repeated pressure treatment while avoiding prominent grinding effects, soaking the resulting dry fibrous mass in water and treating the soaked mass to separate starch therefrom.

LAURITS PEDERSEN HELTNE.